(12) United States Patent
Williams

(10) Patent No.: US 10,429,071 B2
(45) Date of Patent: Oct. 1, 2019

(54) FUEL INJECTOR

(71) Applicant: Rolls-Royce plc, London (GB)

(72) Inventor: Brandon P. Williams, West Des Moines, IA (US)

(73) Assignee: Rolls-Royce plc (GB)

( * ) Notice: Subject to any disclaimer, the term of this patent is extended or adjusted under 35 U.S.C. 154(b) by 104 days.

(21) Appl. No.: 15/460,776

(22) Filed: Mar. 16, 2017

(65) Prior Publication Data

US 2017/0284673 A1 Oct. 5, 2017

Related U.S. Application Data

(60) Provisional application No. 62/315,973, filed on Mar. 31, 2016.

(51) Int. Cl.
*F23R 3/14* (2006.01)
*F23R 3/28* (2006.01)
*F23R 3/34* (2006.01)
*F02C 3/04* (2006.01)
*F23R 3/58* (2006.01)
*B23K 1/00* (2006.01)
*F23D 11/38* (2006.01)

(52) U.S. Cl.
CPC .............. *F23R 3/14* (2013.01); *B23K 1/0018* (2013.01); *F02C 3/04* (2013.01); *F23D 11/383* (2013.01); *F23R 3/28* (2013.01); *F23R 3/343* (2013.01); *F23R 3/346* (2013.01); *F23R 3/58* (2013.01); *F23R 3/34* (2013.01); *F23R 2900/00018* (2013.01)

(58) Field of Classification Search
CPC .... F23R 3/14; F23R 3/28; F23R 3/283; F23R 3/16; F23R 2900/00012; F23R 3/34; B23K 1/0018; F02C 3/04; F02C 7/14; F02C 7/18; F28D 9/0062; F28D 9/0093; F28F 3/08; F28F 19/00
See application file for complete search history.

(56) References Cited

U.S. PATENT DOCUMENTS 3,915,387 A * 10/1975 Caruel ...................... F23R 3/14
239/400
5,505,045 A * 4/1996 Lee .......................... F23D 11/107
239/424
5,511,375 A 4/1996 Joshi
(Continued)

FOREIGN PATENT DOCUMENTS

DE 102004059882 A1 6/2006
GB 2481075 A 12/2011
WO 2009069426 A1 6/2009

*Primary Examiner* — Todd E Manahan
*Assistant Examiner* — Eric W Linderman
(74) *Attorney, Agent, or Firm* — Barnes & Thornburg LLP

(57) ABSTRACT

A staged fuel injector comprises a pilot inner air swirler arranged along a centre axis of the injector, a pilot fuel swirler arranged radially outboard of the pilot inner air swirler, a main inner air swirler arranged radially outboard of the pilot fuel swirler and a main fuel swirler arranged radially outboard of the pilot fuel swirler. A fuel feed arm is arranged in fluid communication with the pilot fuel swirler and the main fuel swirler for delivering fuel to the pilot fuel swirler and the main fuel swirler and a heat protective casing enclosing the fuel feed arm, the pilot fuel swirler and the main fuel swirler.

6 Claims, 3 Drawing Sheets

(56) References Cited

U.S. PATENT DOCUMENTS

| | | | |
|---|---|---|---|
| 5,701,732 A * | 12/1997 | Nesbitt | F02C 7/232 60/39.094 |
| 5,761,907 A * | 6/1998 | Pelletier | F23D 11/107 239/397.5 |
| 5,865,024 A | 2/1999 | Kress et al. | |
| 6,141,967 A | 11/2000 | Angel et al. | |
| 6,272,840 B1 | 8/2001 | Crocker et al. | |
| 6,363,726 B1 * | 4/2002 | Durbin | F23R 3/14 60/748 |
| 6,389,815 B1 * | 5/2002 | Hura | F23R 3/346 60/746 |
| 6,418,726 B1 * | 7/2002 | Foust | F23R 3/14 60/748 |
| 6,460,344 B1 | 10/2002 | Steinthorsson et al. | |
| 6,560,964 B2 | 5/2003 | Steinhorsson et al. | |
| 6,622,488 B2 * | 9/2003 | Mansour | F23D 11/107 239/403 |
| 6,755,024 B1 | 6/2004 | Mao et al. | |
| 6,883,332 B2 | 4/2005 | Steinthorsson et al. | |
| 9,310,073 B2 * | 4/2016 | Buelow | F23R 3/28 |
| 9,664,391 B2 * | 5/2017 | Kobayashi | F23R 3/14 |
| 10,072,845 B2 * | 9/2018 | Mook | F23R 3/14 |
| 10,077,714 B2 * | 9/2018 | Siders | F23R 3/14 |
| 2003/0196440 A1 | 10/2003 | Steinthorsson et al. | |
| 2005/0268618 A1 | 12/2005 | Johnson et al. | |
| 2006/0248898 A1 * | 11/2006 | Buelow | F23R 3/14 60/776 |
| 2007/0289306 A1 | 12/2007 | Suria et al. | |
| 2008/0078183 A1 | 4/2008 | Ziminsky et al. | |
| 2008/0083229 A1 | 4/2008 | Haynes et al. | |
| 2008/0148736 A1 | 6/2008 | Ishizaka et al. | |
| 2008/0289341 A1 | 11/2008 | Ishizaka et al. | |
| 2009/0044538 A1 * | 2/2009 | Pelletier | F23R 3/14 60/740 |
| 2009/0140073 A1 * | 6/2009 | Thomson | F23D 11/36 239/128 |
| 2009/0255116 A1 * | 10/2009 | McMasters | B23P 6/007 29/889.1 |
| 2009/0255120 A1 * | 10/2009 | McMasters | F23D 11/383 29/889.2 |
| 2009/0255262 A1 * | 10/2009 | McMasters | F23R 3/14 60/742 |
| 2010/0263382 A1 * | 10/2010 | Mancini | F23R 3/14 60/742 |
| 2011/0067403 A1 * | 3/2011 | Williams | F23R 3/343 60/742 |
| 2012/0047903 A1 * | 3/2012 | Williams | F02C 7/22 60/746 |
| 2012/0292408 A1 * | 11/2012 | Short | F23D 11/103 239/463 |
| 2013/0298403 A1 * | 11/2013 | Thomson | F23R 3/283 29/890.09 |
| 2014/0157781 A1 * | 6/2014 | Moran | F23R 3/14 60/746 |
| 2016/0265780 A1 * | 9/2016 | Patel | F23R 3/283 |
| 2016/0305327 A1 * | 10/2016 | Patel | F23R 3/286 |
| 2017/0082288 A1 * | 3/2017 | Ryon | F23R 3/14 |
| 2017/0089582 A1 * | 3/2017 | Carrotte | F23R 3/14 |
| 2017/0122565 A1 * | 5/2017 | Mulcaire | F23R 3/16 |

* cited by examiner

FUEL INJECTOR

CROSS REFERENCE TO RELATED APPLICATIONS

This application claims priority to and the benefit of U.S. Provisional Patent Application No. 62/315,973, filed 31 Mar. 2016, the disclosure of which is now expressly incorporated herein by reference.

FIELD OF THE DISCLOSURE

The present disclosure relates generally to fuel injectors, and more particularly to a design of components of a staged fuel injector for a gas turbine engine and a method of manufacture which results in a more consistent and predictable result than prior known methods of manufacture.

BACKGROUND

Increased regulation of emissions from gas turbine engines has prompted the development of thermally efficient and reduced emission fuel injectors. It is known that carbon monoxide (CO) and unburned hydrocarbons (UHC) emissions can be reduced with high temperature combustion in the engine. However, high temperature combustion can result in increased production of nitrogen oxides ($NO_x$). This problem has been addressed by injectors which are configured more thoroughly to mix fuel with air prior to combustion with a fuel-to-air ratio below the stoichiometric level. Such arrangements can provide a "lean burn" which results in lower flame temperatures than would occur with stoichiometric burning. Since the production of $NO_x$ is a strong function of temperature, a reduced flame temperature or "lean burn" results in lower levels of NOx.

Staged fuel injection is known to result in reduced engine emissions. In such arrangements, the combustion process is divided into two (or more) zones or stages. These stages are typically physically separate from each other, but close enough to permit interaction. Separation can be axial and/or radial separation. A first, pilot stage is configured to provide fuel for low power operations. In higher power conditions, the pilot continues to provide fuel to the engine and in addition a second, main stage provides the remaining fuel needed for engine operation. In this way, proper fuel-to-air ratios can be controlled for efficient combustion, reduced emissions, and good stability.

Along with staged combustion, pollutant emissions can be reduced by providing a more thoroughly mixed fuel-air mixture prior to combustion wherein the fuel-to-air ratio is below the stoichiometric level so that the combustion occurs at lean conditions. Lean burning results in lower flame temperatures than would occur with stoichiometric burning. Since the production of $NO_x$ is a strong function of temperature, a reduced flame temperature results in lower levels of NOx. The technology of directly injecting liquid fuel into the combustion chamber and enabling rapid mixing with air at lean fuel-to-air ratios is called lean direct injection (LDI). A gas turbine engine typically comprises multiple injectors and non-variation from one injector to another is important for predictable performance of the engine.

With an ever increasing demand for higher temperature operability, the heat load on some components of the injector becomes less tolerable and the operational life of the injector limited.

It is common practice to weld components of a fuel injector. Weld joints can shrink variably from one injector assembly to the next and can distort the surrounding metal parts due to heat input thermal gradients. For example, in the weld between a heat shield and an air swirler, minute peaks and valleys of melted and re-solidified metal can result creating stress concentrations that can start fatigue cracks unpredictably and impact on the life of the component. FIG. 1 illustrates a staged fuel injector having a prior known configuration. The injector is shown in perspective view from an upstream end (FIG. 1a) and in schematic axial cross section (FIG. 1b). The injector comprises a pilot inner air swirler 101 arranged on a centreline C-C. Immediately radially outboard of the pilot inner air swirler 101 is a pilot fuel swirler 105. A main fuel swirler 106 sits radially outboard of the pilot fuel swirler 105. A main inner air swirler 102 sits radially between the pilot fuel swirler 105 and the main fuel swirler 106. In the embodiment shown, the main fuel swirler branches to provide a pilot outer air swirler 104 which sits radially between the pilot fuel swirler 105 and a radially outer branch 102. A fuel tube 107 extends radially outwardly and is arranged to deliver fuel to the main fuel swirler 106. A separate conduit 108 extends from the fuel tube 107 to the main inner air swirler 102 to deliver fuel to the pilot fuel swirler 105. At an upstream end of the injector assembly, a heat protective casing 103 is arranged to cover upstream ends of the fuel swirlers 105, 106 and fuel tube 107 (including conduit 108). The air swirlers 101, 102 and 104 remain open so as, when in use in a gas turbine engine, to receive a flow of compressed air arriving from upstream of the casing. The air flows substantially in an axial direction in parallel with the centreline C-C.

The casing 103 has an upstream facing radially extending surface which inclines from an upstream position proximal to the fuel tube 107 to a downstream position distal to the fuel tube 107. It will be appreciated that the walls of the main inner air swirler 102 terminate at different axial positions at the upstream end. This shaping has been developed to allow access behind the fuel injector for assembly, repair and maintenance and also to keep weight down.

The various components of the fuel injector are welded at the weld zones marked W1 (pilot inner air swirler 101 to casing 103), W2 (main inner air swirler 102 to casing 103) W3 (a radially outer section of the casing 103a to a radially inner section of the casing 103b), W4 (walls 102a, 102b of main inner air swirler 102 to walls of main fuel swirler 106 and pilot fuel swirler 105). Typically, these welds join very thin (for example about 0.03 inches/0.75 mm) high strength alloys together or to thicker sections.

Welding processes may be inherently difficult to control and so it may be difficult to achieve easily repeatable results on similar components. The nature of the thin-thick material and geometry of these joints means that the welding process can add more heat to some components than others. Consequently, welds may pull the components into various distortions and interferences with each other resulting in inconsistent joints and dimensional stack ups from one injector to the next. Additionally, gaps in air swirler ducts can be made inconsistent within a single injector, causing potential unwanted air disturbances and consequent inefficiencies in the fuel burn.

The back side of the welds also may be unpredictable. It can leave inherent sharp valleys that can cause cracks to start sooner than expected due to the nature of the vibrations that may be experienced by the injector when in use in a gas turbine engine. The complicated geometry is not conducive to automated welding methods. Weld beads from part to part or even on the same part can vary in size and shape small differences cumulatively having a significant effect.

There is a desire to provide a staged fuel injector which can be manufactured by a more repeatable process and hence a more consistent and predictable behaviour in operation.

SUMMARY

The present disclosure may comprise one or more of the following features and combinations thereof.

In illustrative embodiments, the present disclosure provides a staged fuel injector comprising a pilot inner air swirler arranged along a centre axis of the injector, a pilot fuel swirler arranged radially outboard of the pilot inner air swirler, a main inner air swirler arranged radially outboard of the pilot fuel swirler and a main fuel swirler arranged radially outboard of the pilot fuel swirler; a fuel tube arranged in fluid communication with the pilot fuel swirler and the main fuel swirler for delivering fuel to the pilot fuel swirler and the main fuel swirler and a heat protective casing enclosing the fuel tube, the pilot fuel swirler and the main fuel swirler, wherein walls of the pilot and main inner air swirlers extend axially, together terminating in a common radial plane with the heat protective casing and adjacent axially extending walls of the heat protective casing, the pilot inner air swirler, and the main inner air swirler are joined by a braze.

Prior known fuel injectors have component designs which are not conducive to brazing. The inventors have redesigned multiple components to provide components which can be conveniently assembled and consistently joined using a braze.

For an effective braze joint, components with an elongate overlap may be helpful. A small basin is provided between the surfaces to be brazed, typically in the form of an annularly extending recess in one or both of the walls to be joined.

The main inner air swirler may be configured to branch at a downstream end to form an intermediate and radially outer air swirler. The intermediate and radially outer air swirler may be integrally formed or may comprise separate components joined together. Where these swirlers comprise separate components, they may be joined by braze. For example, the intermediate air swirler has a radially inner axially extending wall which is brazed to a wall of the pilot fuel swirler.

Components of the fuel injector are configured to be assembled. The feed arm forms the main structural component and receives other components and/or component sub-assemblies from the downstream or upstream side. Between adjacent components and component sub-assemblies, in the axially extending walls, is provided a basin which is filled with braze material. Once the assembly is complete, the assembly is subjected to heat sufficient to melt the braze material and form the braze joints. The process is well suited to batch processing of multiple injectors. A benefit of the process is that, by careful control of tolerances in the manufacture of the components of the assembly, a consistent and predictable end product can be achieved.

Parts of the axially extending walls of the main inner air swirler may include a radially extending passage through which the fuel tube extends to an inlet of the pilot fuel swirler. A radially outer axially extending wall of the main inner air swirler may be joined by a braze to an axially extending wall of the main fuel swirler at a location downstream of the casing and a radially inner wall of the main inner air swirler may be joined by a braze to an axially extending wall of the primary fuel swirler at a location downstream of the casing.

In one option, the assembly process may involve prior thermal resizing of components. This allows a tighter fit to be achieved between components, reducing the impact of vibrations on the assembly. The Assignee's previously published patent U.S. Pat. No. 7,926,178 describes a thermal resizing brazing method for brazing together components of a fuel swirler. The present disclosure provides an assembly including novel designs of other components of the fuel injector which collectively permit the entire fuel injector assembly to be brazed together in a single heating step in preference to multiple brazing/welding steps.

In the context of the claim, the terms "upstream" and "downstream" should be understood to refer to the direction of flow of fuel and air through the nozzle, typically this will be the same as the direction of flow of a working fluid passing through a gas turbine engine in which the injector is incorporated.

In another aspect, the disclosure comprises a gas turbine engine incorporating a staged fuel injector as referred to above.

In brazing, two surfaces (often of dissimilar material) are aligned either side of a melting and flowing filler metal, the filler metal having a lower melting point than the adjoining metal. The filler metal spreads across the interface between the two surfaces and commences bonding with each surface. On cooling of the filler material at the interface, the two surfaces become joined together. U.S. Pat. No. 7,926,178, the content of which is incorporated herein by reference, describes a brazing method suitable for use in the manufacture of fuel injectors in accordance with the present disclosure. In this method, thermal resizing of one or both components is performed to ensure very close contact at the braze interface when the components are returned to equal temperature. An advantage of brazing is the ability to join the same or different metals with considerable strength.

A staged fuel injector may include a pilot inner air swirler, a pilot fuel swirler, a main inner air swirler, and a fuel tube. The pilot inner air swirler may be arranged along a centre axis of the injector. The pilot fuel swirler may be arranged radially outboard of the pilot inner air swirler. The main inner air swirler may be arranged radially outboard of the pilot fuel swirler. The main fuel swirler may be arranged radially outboard of the pilot fuel swirler. The fuel tube may be arranged in fluid communication with the pilot fuel swirler and the main fuel swirler for delivering fuel to the pilot fuel swirler and the main fuel swirler and a heat protective casing enclosing the fuel tube, the pilot fuel swirler and the main fuel swirler. The walls of the pilot and main inner air swirlers may extend axially, together terminating in a common radial plane with the heat protective casing and adjacent axially extending walls of the heat protective casing, the pilot inner air swirler, and the main inner air swirler may be joined by a braze.

In some embodiments, the main inner air swirler may branch at a downstream end to form an intermediate outer air swirler and a radially outer air swirler. In some embodiments, the intermediate outer air swirler and the radially outer air swirler may be integrally formed.

In some embodiments, the intermediate outer air swirler and the radially outer air swirler may be formed from separate components which are joined by a braze. In some embodiments, component and component sub-assemblies of the fuel injector may be configured to be assembled, in sequence, in an upstream to downstream direction, the casing forming the most upstream end of the assembly, are assembled with braze between circumferentially facing surfaces of the components and are heated to complete the brazing process after assembly. In some embodiments, the staged fuel injector may further include a gas turbine engine having a combustor and the combustor incorporates the staged fuel injector.

According to another aspect of the present disclosure, a method for manufacturing a staged fuel injector may include a number of steps. The staged fuel injector may include a pilot inner air swirler, a pilot fuel swirler, a main inner air swirler and a main fuel swirler; a fuel tube for delivering fuel to the pilot fuel swirler and the main fuel swirler and a heat protective casing enclosing the fuel feed arm, the pilot fuel swirler and the main fuel swirler, wherein axially extending walls of the pilot and main inner air swirlers and the heat protective casing are configured, on assembly, to terminate in a common radial plane and are configured to receive a deposit of braze between adjacent surfaces of the axially extending walls when assembled. The method may include depositing braze on the adjacent faces of the axially extending walls, inserting the pilot inner air swirler into the heat protective casing with central axes of the pilot inner air swirler and heat protective casing substantially in coaxial alignment and ends of the axially extending walls substantially aligned in a common radial plane, arranging the pilot fuel swirler and the main fuel swirlers radially outboard of the pilot inner air swirler, with the main fuel swirler radially outboard of the pilot fuel swirler and each in substantially coaxial alignment with the pilot inner air swirler and heat protective casing and ends of the axially extending walls substantially aligned in the common radial plane, arranging the main inner air swirler between the pilot fuel swirler and the main fuel swirler in substantially coaxial alignment with the pilot inner air swirler and heat protective casing and ends of the axially extending walls substantially aligned in the common radial plane, thereby to provide an assembled staged fuel injector, applying heat to the assembled staged fuel injector sufficient to cause the braze to melt, and allowing the assembled staged fuel injector to cool thereby forming brazed joints between the adjacent surfaces of the axially extending walls.

In some embodiments, the main inner air swirler may have a radially outer axially extending wall which is arranged, on assembly to sit adjacent an axially extending wall of the main fuel swirler at a location downstream of the common radial plane and a radially inner axially extending wall arranged on assembly to sit adjacent an axially extending wall of the primary fuel swirler at a location downstream of the common radial plane. Adjacent surfaces of axially adjacent surfaces of the axially extending walls may be configured to receive a deposit of braze therebetween. Braze may be deposited therebetween prior to arranging the main inner air swirler between the pilot fuel swirler and the main fuel swirler.

In some embodiments, the method may further include thermally resizing of one or more of the pilot inner air swirler, pilot fuel swirler, main inner air swirler, main fuel swirler and casing as a preliminary step to assembling the assembled staged fuel injector. In some embodiments, adjacent surfaces of the axially extending walls may include a small basin configured to receive the braze. In some embodiments, the small basin may be in the form of an annularly extending recess in one or both of the walls to be joined.

These and other features of the present disclosure will become more apparent from the following description of the illustrative embodiments.

BRIEF DESCRIPTION OF THE DRAWINGS

An embodiment of the disclosure will now be further described with reference to the accompanying Figure in which;

FIG. 1b shows a schematic cross sectional view of the staged fuel injector of FIG. 1a;

DETAILED DESCRIPTION OF THE DRAWINGS

Figure 1B:
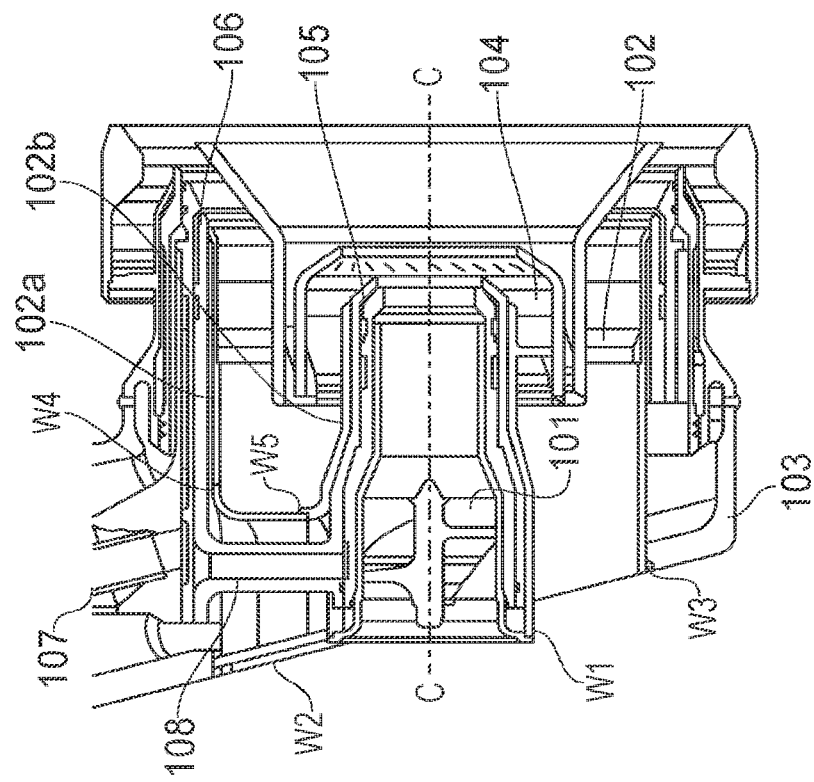
Figure 1A:
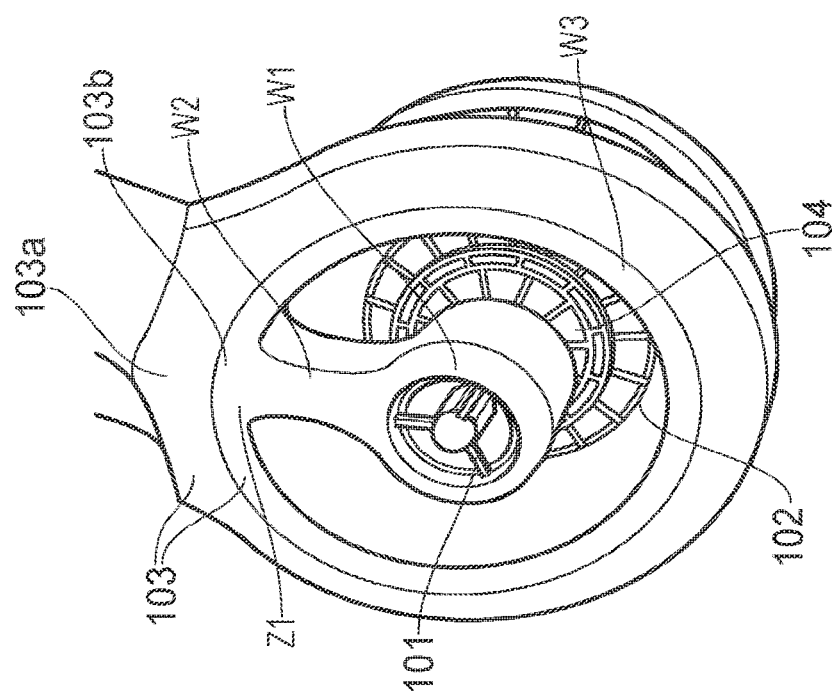
FIG. 1a shows a perspective view from an upstream end of a staged fuel injector as known from the prior art.

For the purposes of promoting an understanding of the principles of the disclosure, reference will now be made to a number of illustrative embodiments illustrated in the drawings and specific language will be used to describe the same.

Figure 2:
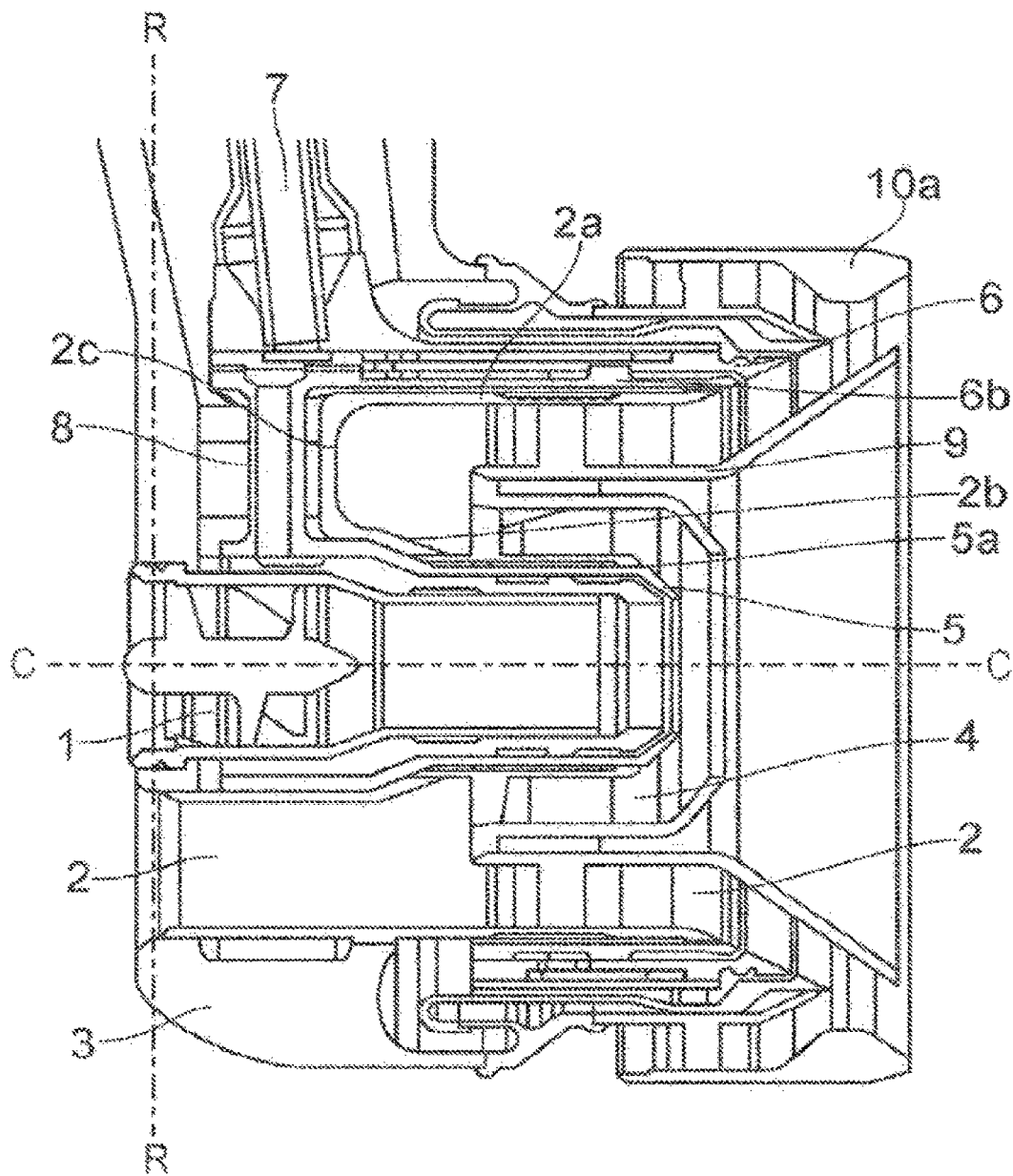
FIG. 2 shows in cross section, an embodiment of a staged fuel injector in accordance with the present disclosure.

FIG. 2 illustrates an embodiment of a staged fuel injector of the disclosure. The staged fuel injector is configured to be assembled and subsequently brazed in a single heating step.

As can be seen the staged fuel injector of the embodiment comprises a pilot inner air swirler 1 arranged on an axial centreline C-C of the staged fuel injector. At an upstream end, the radially outer wall 1a of the pilot inner air swirler 1 is received in a central aperture of an annular heat protective casing 3 which extends in a plane R-R which is substantially orthogonal to the axial centreline C-C. Within the radially outer wall, in an axial position adjacent a facing radial wall of the casing 3 is provided an annularly extending recess into which a braze material is provided prior to insertion of the pilot inner air swirler 1 into the central aperture of the casing 3.

Arranged radially adjacent and outboard of the pilot inner air swirler 1 is the pilot fuel swirler 5. Whilst other configurations of fuel swirler could be substituted without departing from the scope of the disclosure as claimed, the pilot fuel swirler 5 of the shown embodiment comprises a dual walled component, the walls together defining flow passages for fuel delivered to an inlet from a fuel feed arm feed 7 via a conduit 8. The walls of the pilot fuel swirler 5 may be configured and assembled in accordance with the method described in prior published patent U.S. Pat. No. 7,926,178. These walls may be brazed together prior to insertion in the staged fuel injector assembly, or may be brazed as part of a single heating operation used to braze components of the entire assembly together.

The radially outer wall 5a of the pilot fuel swirler 5 extends radially outwardly at an upstream end and turns back to extend axially and define an annular space. The radially outer wall enclosing the annular space serves as an inner wall 6b of a dual walled main fuel swirler which has a similar construction to the pilot fuel swirler 5. The walls of the main fuel swirler 6 may be configured and assembled in accordance with the method described in prior published patent U.S. Pat. No. 7,926,178. These walls may be brazed together prior to insertion in the staged fuel injector assembly, or may be brazed as part of a single heating operation used to braze components of the entire assembly together.

In the annular space there is inserted a main inner air swirler 2 which is bounded by radially inner and outer walls 2a, 2b which are connected by a radially extending wall 2c. The axially extending walls 2a, 2b fit snugly against walls 5a and 6b of the pilot and main fuel swirlers 5, 6. A separating wall 9 divides a downstream end of the main inner air swirler into two radially adjacent swirler passages 2 and 4. Between adjacent surfaces of the main inner air swirler walls 2a, 2b, 2c and the walls of the main and pilot fuel swirlers 5a, 6b, an annular gap is filled with braze. Braze may additionally be provided between the facing radially extending surfaces of these components.

Finally a radially outer wall 10a is positioned radially outboard of the main fuel swirler 6 defining a bounding wall of an outer air swirler 10. The outer air swirler 10 is optionally formed integrally with the main inner air swirler 2. A radially inner wall of the outer air swirler 10 may be brazed to a radially adjacent wall which may form part of the heat protective casing and is radially outboard of the main fuel swirler 6.

Figure 3:
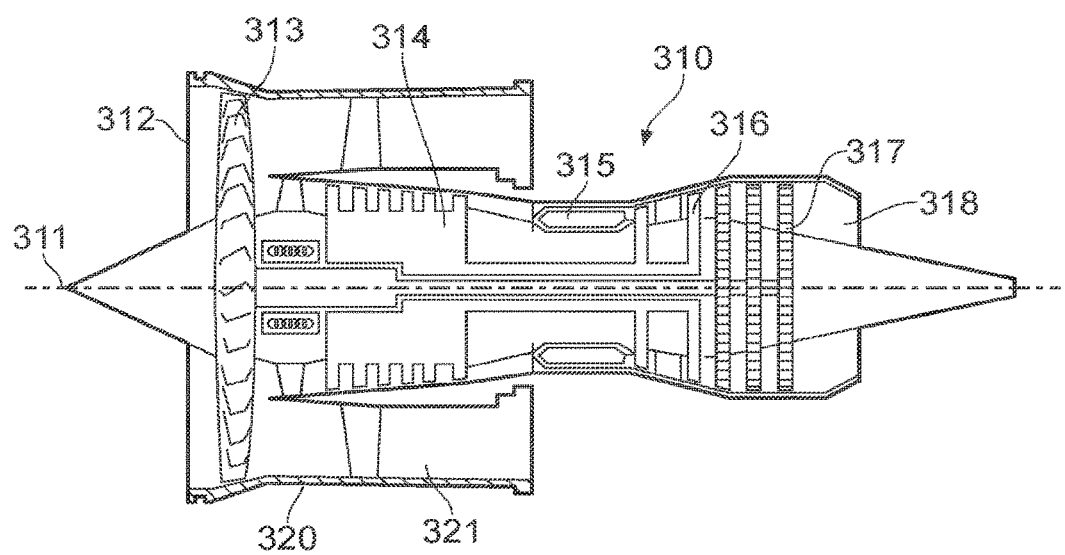
FIG. 3 shows a sectional side view of a gas turbine engine as is known from the prior art.

With reference to FIG. 3, a gas turbine engine is generally indicated at 310, having a principal and rotational axis 311. The engine 310 comprises, in axial flow series, an air intake 312, a propulsive fan 313, a high-pressure compressor 314, combustion equipment 315, a high-pressure turbine 316, a low-pressure turbine 317 and an exhaust nozzle 318. A nacelle 320 generally surrounds the engine 310 and defines the intake 312.

The gas turbine engine 310 works in the conventional manner so that air entering the intake 312 is accelerated by the fan 313 to produce two air flows: a first air flow into the high-pressure compressor 314 and a second air flow which passes through a bypass duct 321 to provide propulsive thrust. The high-pressure compressor 314 compresses the air flow directed into it before delivering that air to the combustion equipment 315.

In the combustion equipment 315 the air flow is mixed with fuel and the mixture combusted. The resultant hot combustion products then expand through, and thereby drive the high and low-pressure turbines 316, 317 before being exhausted through the nozzle 318 to provide additional propulsive thrust. The high 316 and low 317 pressure turbines drive respectively the high pressure compressor 314 and the fan 13, each by suitable interconnecting shaft.

Other gas turbine engines to which the present disclosure may be applied may have alternative configurations. By way of example such engines may have an alternative number of interconnecting shafts (e.g. three) and/or an alternative number of compressors and/or turbines. Further the engine may comprise a gearbox provided in the drive train from a turbine to a compressor and/or fan. The engine may be configured as a turbojet engine. The disclosure is applicable to any of this variety of engine configurations.

Within the combustion equipment sits a fuel injector which may, for example, have the configuration of a staged fuel injector in accordance with the disclosure described herein.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A staged fuel injector comprising
   a pilot inner air swirler arranged along a centre axis of the injector, a pilot fuel swirler arranged radially outboard of the pilot inner air swirler, a main inner air swirler arranged radially outboard of the pilot fuel swirler and a main fuel swirler arranged radially outboard of the pilot fuel swirler;
   a fuel tube arranged in fluid communication with the pilot fuel swirler and the main fuel swirler for delivering fuel to the pilot fuel swirler and the main fuel swirler and
   a heat protective casing enclosing the fuel tube, the pilot fuel swirler and the main fuel swirler,
   wherein the pilot inner air swirler has an axially and circumferentially extending pilot air swirler surface that faces radially outward, the pilot fuel swirler has an axially and circumferentially extending pilot fuel swirler surface that faces radially inward and is spaced apart radially from the pilot air swirler surface to define a first basin radially between the pilot air swirler surface and the pilot fuel swirler surface, and an axial and circumferentially extending first layer of braze is located in the first basin and contacts the pilot air swirler surface and the pilot fuel swirler surface, and
   wherein the main inner air swirler has an axially and circumferentially extending main air swirler surface that faces radially outward, the main fuel swirler has an axially and circumferentially extending main fuel swirler surface that faces radially inward and is spaced apart radially from the main air swirler surface to define a second basin radially between the main air swirler surface and the main fuel swirler surface, and an axial and circumferentially extending second layer of braze is located in the second basin and contacts the main air swirler surface and the main fuel swirler surface.

2. The staged fuel injector of claim 1, wherein the main inner air swirler branches at a downstream end to form an intermediate outer air swirler and a radially outer air swirler.

3. The staged fuel injector of claim 1, wherein the intermediate outer air swirler and the radially outer air swirler are integrally formed.

4. The staged fuel injector of claim 2, wherein the intermediate outer air swirler and the radially outer air swirler are formed from separate components which are joined by a braze.

5. The staged fuel injector of claim 1, wherein the fuel injector is configured to be assembled in a predetermined sequence, wherein the pilot air swirler is first inserted into the casing from an upstream end, the pilot fuel swirler and the main fuel swirler are added from a downstream end, and the main air swirler is assembled from a downstream end between the pilot fuel swirler and the main fuel swirler.

6. The staged fuel injector of claim 1, further comprising a gas turbine engine having a combustor and the combustor incorporates the staged fuel injector.

* * * * *